UNITED STATES PATENT OFFICE.

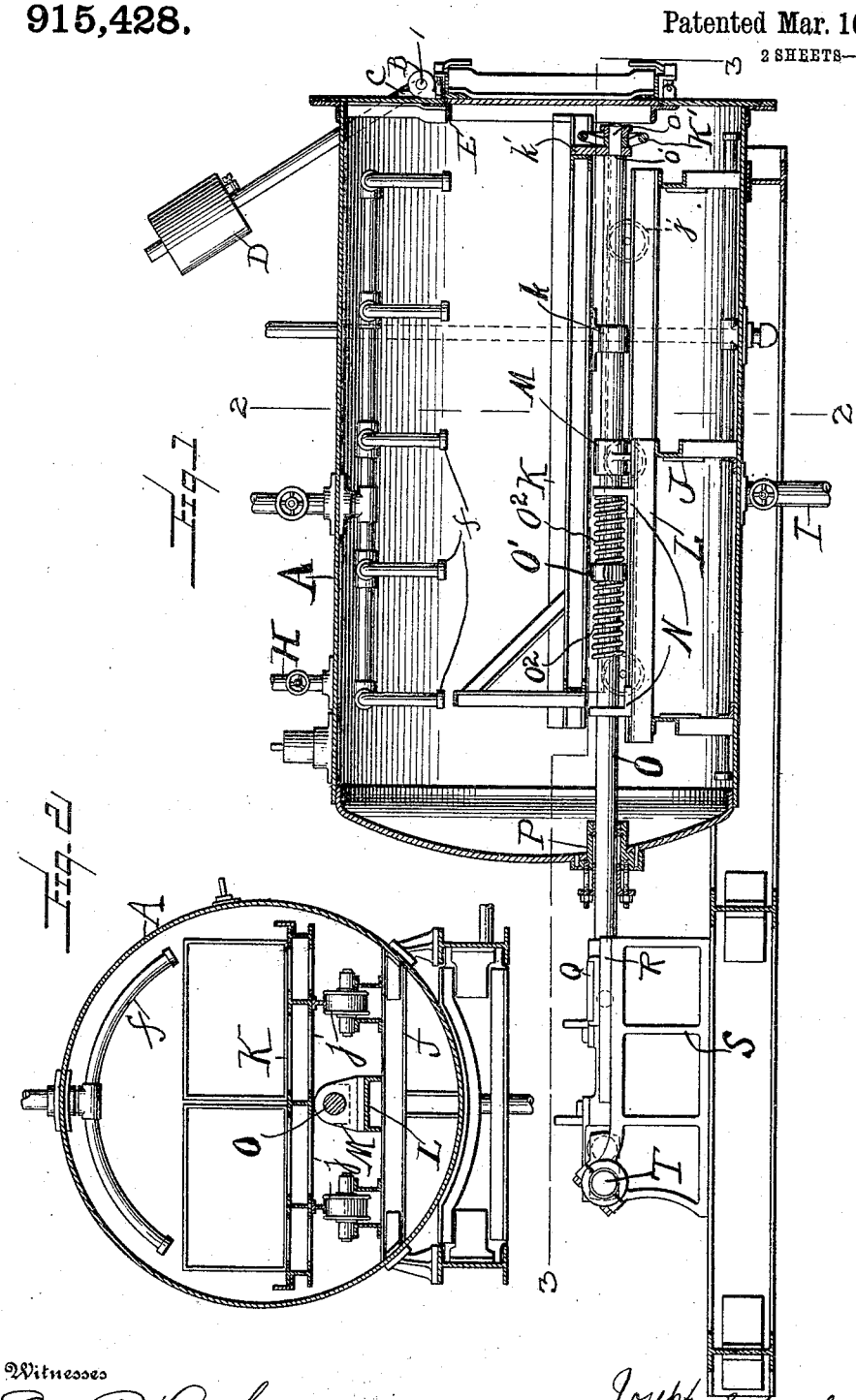

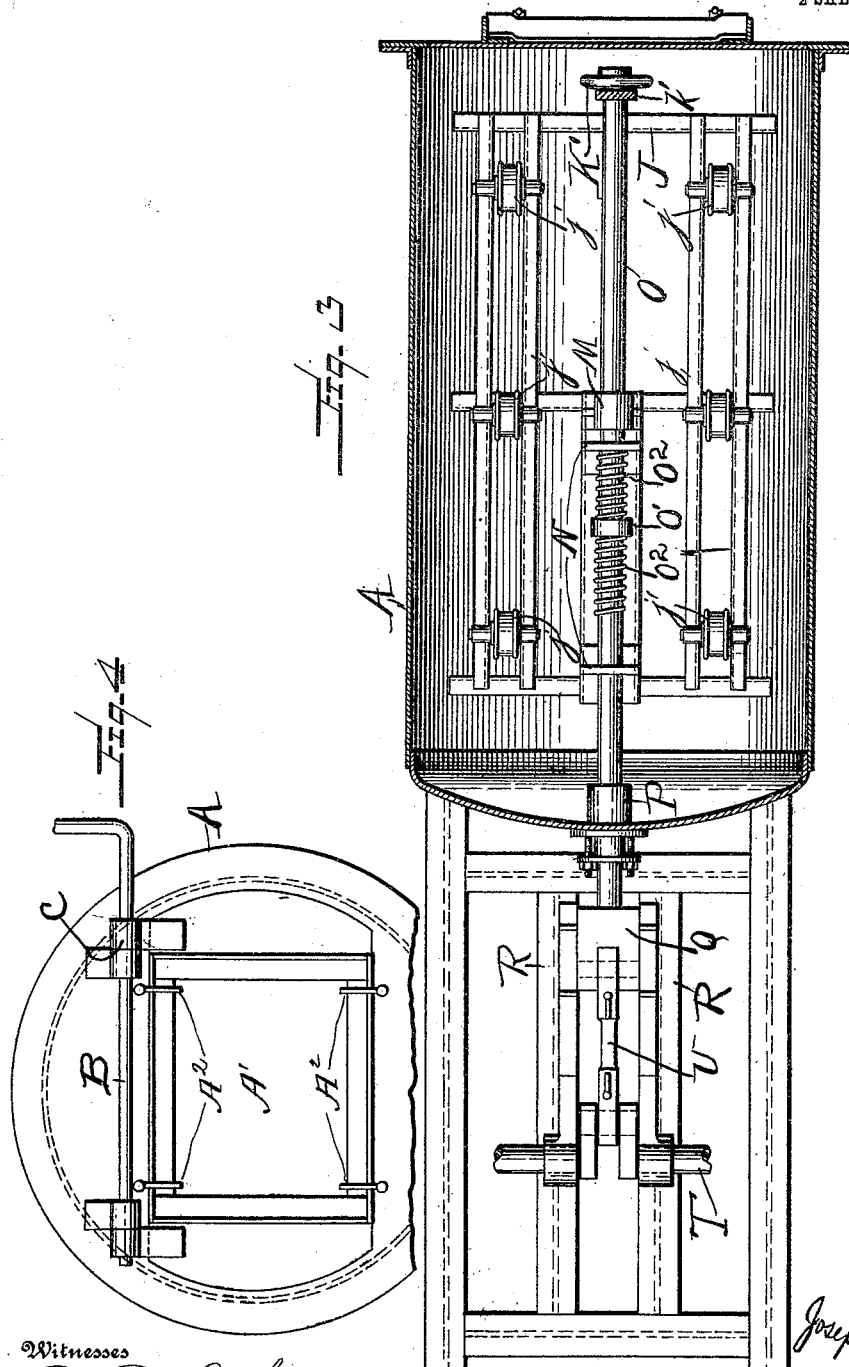

JOSEPH S. GUIBBINI, OF BENICIA, CALIFORNIA.

COMBINED RETORT AND SHAKER AND COOLER.

No. 915,428.          Specification of Letters Patent.          Patented March 16, 1909.

Application filed June 9, 1908. Serial No. 437,580.

*To all whom it may concern:*

Be it known that I, JOSEPH S. GUIBBINI, a citizen of the United States of America, residing at Benicia, in the county of Solano, State of California, have invented certain new and useful Improvements in a Combined Retort and Shaker and Cooler, of which the following is a specification.

This invention relates to a combined retort and shaker and is designed as an improvement on the apparatus forming the subject matter of Patent 881,120, issued to me March 10, 1908.

An object of this invention is to provide novel means for coupling the truck to the shaker rod in order that the truck will take motion from the said rod.

A further object of the invention is to provide means for cushioning the stroke of the rod in each direction to prevent a jerking movement of the truck. The slipping of belts of the power applying apparatus is also obviated and the formation of lumps in the milk when cooling is prevented.

A further object of the invention is to provide a retort door which is self-opening, said door being held open during the application and removal of the truck with the milk containers.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a sectional view of a retort and illustrating the remainder of the apparatus embodying the invention in elevation; Fig. 2, is a sectional view on the line 2—2 of Fig. 1; Fig. 3, is a sectional view on the line 3—3 of Fig. 1; and Fig. 4, is an enlarged detail view of the door for the retort.

In these drawings A, denotes a retort having a door A' hinged to its end; said door being mounted on a shaft B, which is rotatable in bearings C. The shaft B, has its end bent at an angle to that portion on which the door is mounted, and said end portion has a weight D, which overcomes the weight of the door and causes said door to swing open when it is released from its fastenings. The door has a packing E, to render it steam-tight, and said packing is preferably L-shaped in order that it will fit in the angle of the door as shown in Fig. 1. The door is pressed into contact with the surface of the retort in order to make a steam-tight joint through the medium of the bolts $A^2$, which bolts are of ordinary type.

The retort A, has a series of segmental sprinklers $f$, designed to admit water to the interior of the retort after the contents of the retort have been heated, the spray from the sprinklers being for the purpose of rapidly cooling the cooked contents of the retort. Steam is admitted to the retort through the supply pipe H, and the condensed steam and water drains through the pipe I.

Within the retort is the frame J, having two series of wheels $j$, on which the truck K, is supported in the retort, it being understood that the said truck is to carry containers for milk or other material to be treated. A center beam L, of the frame supports a guide M, and two brackets N, in which the shaker rod O, is reciprocated, the said shaker rod extending through a packing box P, in the end of the retort and having connection at its outer end with a cross-head Q, slidable in guides R. A frame S, supports the guides and the crank shaft T, which is connected to the cross head by the pitman U. By means of the power transmitting means the shaker rod is reciprocated on a horizontal plane with a smooth, even movement.

The truck frame has a depending guide $k$, to receive the shaker rod O, and also has an end plate $k'$, through which a reduced end $o$, of the shaker rod O, extends. By reducing the end of the shaker rod, a shoulder $o'$, is formed which abuts the inner surface of the end plate $k'$. The reduced end $o$, of the shaker rod is threaded to receive the large nut K', which bears against the outer surface of the end plate $k'$, and as the shaker rod is thus secured to the end plate of the truck, movement of the shaker rod is communicated to said truck.

From the foregoing description and an inspection of the drawing, it will be observed that when a truck is run on the rollers $j$, the shaker rod will be inserted in the guide $k$, and the reduced end of the shaker rod will enter the aperture of the end plate $k'$, after which the nut K', is applied to the reduced end $o$, of the shaker rod. After the contents of the containers on the truck have been treated, the nut K', is removed and the truck is free to be drawn from the rollers of the frame. It will be understood, of course, that during the time the truck is reciprocated steam or other heating agent is admitted to the retort and that when the material being treated is sufficiently cooked or heated, it can be cooled by the admission of sprays of cold water through the sprinklers $f$.

In order to cushion the stroke of the shaker rod near the end of its stroke in each direction, a collar O', is fixed on the shaker rod and a spring $O^2$, encircles the rod on each side of the collar, said springs contacting with the brackets N, just before the shaker rod reaches the end of its stroke. The springs act to prevent jerking motion when the shaker rod reverses its movement and the tension of the springs may be varied to suit particular requirements.

I claim—

1. In a retort and shaker, a retort having heat applying and cold applying apparatus and a drain, a frame in the retort, a receptacle holder mounted to move on the frame, a shaker rod, means for connecting the shaker rod to the receptacle holder, a guide on the receptacle holder through which the shaker rod projects, brackets and a guide on the frame in which the shaker rod reciprocates, means on the shaker rod engaging the brackets to cushion the shaker rod, and means for reciprocating the shaker rod.

2. In a retort and shaker, a retort, supports therein, a moving member on the supports, a shaker rod connected to the moving member, brackets on the supports through which the shaker rod moves, springs encircling the shaker rod, a collar between the springs, and means for reciprocating the shaker rod.

3. In a retort and shaker, a retort having heat applying means, a cooling apparatus and a drain, a frame in the retort, a truck capable of reciprocating with relation to the frame, a shaker rod, a plate depending from the truck having an aperture to receive the end of the shaker rod, means for securing the shaker rod to the plate, a guide on the truck through which the shaker rod projects, brackets and a guide on the frame in which the shaker rod reciprocates, means on the shaker rod engaging the brackets to cushion the shaker rod, and means for reciprocating the shaker rod.

4. In a retort and shaker, a retort having a frame therein, a truck capable of reciprocating with relation to the frame, brackets and a guide on the frame, a shaker rod movable therethrough, means for connecting the shaker rod to the truck, means for reciprocating the shaker rod, springs encircling the shaker rod and adapted to alternately contact a bracket and means on the shaker rod against which the ends of the springs abut.

5. In a retort and shaker, a retort having a frame, a truck capable of reciprocating with relation to the frame, a shaker rod, brackets on the frame through which the shaker rod moves, springs encircling the shaker rod, a collar between the springs, and means for reciprocating the shaker rod.

In testimony whereof I affix my signature in the presence of two witnesses.

JOSEPH S. GUIBBINI.

Witnesses:
E. M. BILLINGS,
H. K. WHITE.